A. G. F. KUROWSKI.
TYPE WRITING MACHINE.
APPLICATION FILED SEPT. 18, 1912.

1,080,285.

Patented Dec. 2, 1913.

Witnesses:
F. E. Alexander
J. A. Brofaly

Inventor
Alfred G. F. Kurowski
by B. C. Stickney
his Attorney

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPE-WRITING MACHINE.

1,080,285.  Specification of Letters Patent.  Patented Dec. 2, 1913.

Application filed September 18, 1912. Serial No. 720,949.

*To all whom it may concern:*

Be it known that I, ALFRED G. F. KUROWSKI, a citizen of the United States, residing in Brooklyn borough, in the county of Kings and State of New York, have invented certain new and useful Improvements in Type-Writing Machines, of which the following is a specification.

This invention relates to devices for releasably connecting the platen to the line-space wheel of a typewriting machine.

An object of the invention is to provide a reliable form of friction clutch having ample holding power for locking the line-space wheel securely to the platen, and positive and reliable means for releasing the clutch. The line-space wheel is loose on the platen axle, and has connected thereto an annular gear wheel with which meshes a pinion on a shaft radial to the platen axle. Said shaft is mounted in a support next to the platen axle, the support having a friction surface coöperating with a friction disk on said radial shaft. The disk can be moved into frictional contact with its support to lock the line-space wheel to the platen axle, by means of spring-actuated levers which cam the disk inwardly. The levers may be released by a wedge carried by a sleeve on the platen axle and actuated by a thumb-piece. Said sleeve may additionally comprise a cam surface operable through a wedge to positively lift the friction disk and release the line-space wheel. The annular gear and pinion may be beveled so as to bring them into tight mesh when the friction disk is moved inwardly, and thereby take up any lost motion between the line-space wheel and platen. The friction disk is preferably of greater diameter than the pinion on its shaft, thereby providing an ample friction holding surface and leverage.

Other objects and advantages will hereinafter appear.

Figure 1:
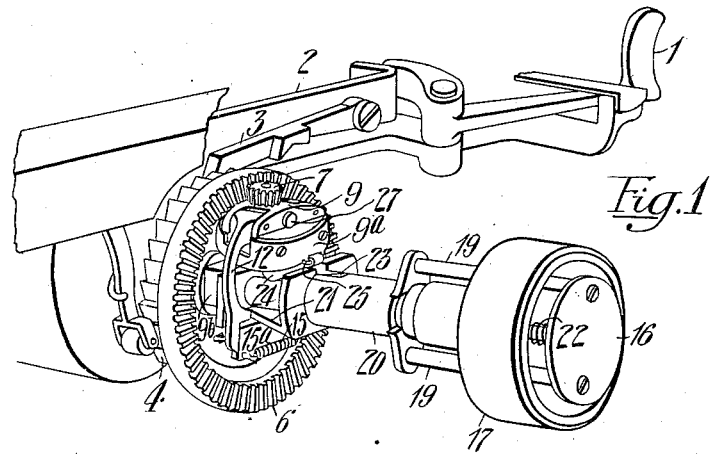
Figures 2, 3:
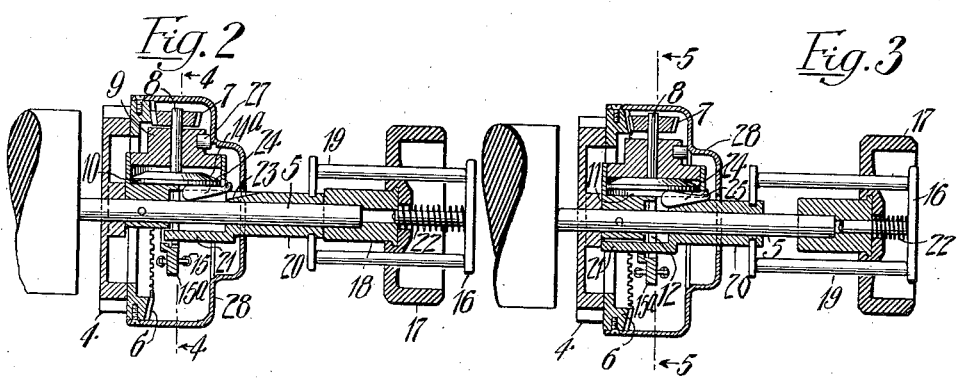
Figure 4:
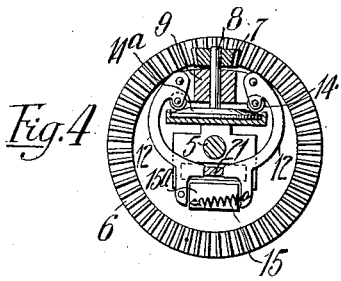
Figure 6:
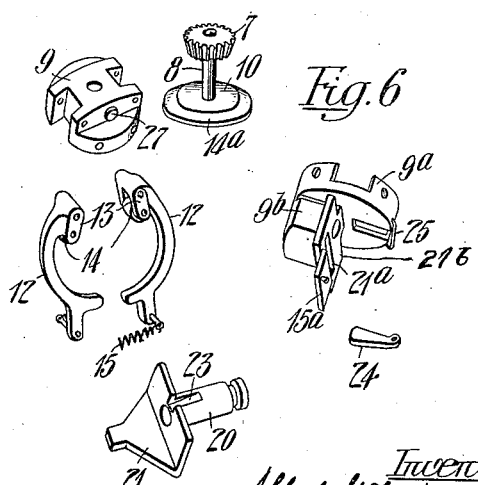
Figure 5:
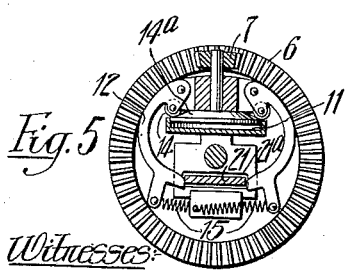

In the accompanying drawings, Figure 1 is a perspective view of a portion of the carriage of an Underwood writing machine with my invention applied thereto. Fig. 2 is a longitudinal section through the improved connection showing the clutch closed. Fig. 3 is a section similar to Fig. 2 showing the clutch released. Fig. 4 is a transverse section taken along line 4—4 of Fig. 2. Fig. 5 is a transverse section taken along line 5—5 of Fig. 3. Fig. 6 is a perspective view illustrating the parts of the connection detached.

The line-space lever 1 by means of a bar 2, drives a pawl 3 to turn the usual line-space wheel 4. The latter is loose upon platen axle 5.

A bevel gear 6 is fixed to the line-space wheel and meshes with a bevel pinion 7, secured on a spindle 8 rotatably mounted in a carrier or head 9, secured to a cup $9^a$, the latter carried by a block $9^b$, fast upon the platen axle. The pinion 7 thus forms a planet gear which travels around the gear 6 when the platen is rotated relatively to the line-space wheel 4. To the inner end of the spindle 8 is fixed a friction disk 10, which is movable in the direction of its axis, together with the spindle and pinion 7 to engage a friction seat 11 formed in the interior of the cup $9^a$; and by such engagement rotation of disk 10 is prevented, and hence the platen and line-space wheel are locked together. When the disk and pinion are moved inward to throw the disk against the friction seat, the teeth of the bevel pinion work into close mesh with the wedge-shaped radiating teeth of the bevel gear, and thus lost motion between the two is eliminated or reduced, so that there is no appreciable shake between the platen and line-space wheel.

A pair of levers 12 are fulcrumed on the carrier 9, and through short arms 13, having rollers 14, engage a coned surface $14^a$ formed on the disk. Springs 15, having their outer ends connected to the outer ends of the levers and their inner ends fastened to the opposite faces of a plate $15^a$ connected to block $9^b$, impel the levers inward toward each other to normally hold the disk in engagement with the friction seat.

To permit the platen to be released and turned relatively to the line-space wheel, a finger-piece 16 is provided adjacent to the usual platen-turning knob 17, the latter being attached by its hub 18 to the end of platen axle 5. This finger-piece is mounted on rods 19 loosely passing through the knob and engaging a sleeve 20 loosely sliding upon the axle. This sleeve has a projecting wedge 21, guided in a slot $21^a$ formed in a plate $21^b$ extending from block $9^b$. The wedge passes between the levers 12 to force them apart, and thereby disengage the friction disk whenever the finger-piece is pressed inwardly. A spring 22 holds the finger-piece in normal position.

To positively lift the disk from the friction seat, I form upon the sleeve 20, an inclined surface 23, which, when the sleeve is moved inwardly, comes into engagement with a releaser 24 pivoted upon a pin 25 at the bottom of the cup 9ª. This releaser projects through a slot 26 formed at the bottom of the cup and engages the friction disk. The sleeve by its inclined surface cams the releaser to positively force the friction disk away from its friction seat, and at the same time shifts the pinion into position to mesh more loosely with the gear. Thus when the finger-piece 16 is pushed in, the axle is perfectly free to move relatively to the feed ratchet, and may easily be adjusted to the desired position.

A shell or casing 28 is fastened to the periphery of the bevel gear and incloses all the parts of the improved connection. The carrier 9 is rigidly connected to the platen axle, and may have a stud 27 to bear against the casing 28 to afford additional support for the shaft 8 to hold the pinion 7 firmly while it is being forced radially toward the inner edge of the gear 6.

It will be clear that by reason of the arrangement of the friction disk with its axis radial to the platen axle as above described, it may be made of substantially larger diameter than the pinion 7, without taking up an undue amount of space; and owing to its large diameter, a very strong grip is secured. The surface speed of the friction disk at its periphery is substantially greater than that of the platen, with resultant increase in effectiveness of the clutch.

Variations may be resorted to within the scope of the invention, and portions of the improvements may be used without others.

Having thus described my invention, I claim:

1. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, and means for moving the disk longitudinally of its axis to engage said friction seat.

2. The combination with a platen axle and a ratchet wheel loose thereon, of a bevel gear connected to the ratchet wheel, a carrier connected to the axle, a planet wheel engaging the bevel gear and rotatably mounted on said carrier on an axis radial to said axle, a friction disk rotatable with said planet wheel, a friction seat for said disk, and means for moving the disk longitudinally of its axis to engage said friction seat.

3. The combination with a platen axle and a ratchet wheel loose thereon, of a gear connected to the ratchet wheel, a carrier connected to the axle, a planet wheel rotatably mounted on said carrier and engaging said gear, a friction disk rotatable with said planet wheel, a friction seat for said disk, said disk having a beveled edge, and a lever engaging said beveled edge to force the disk against its seat.

4. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, said disk having a beveled edge, and a lever having a short arm engaging said beveled edge to force the disk against its seat.

5. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, a pair of levers engaging said disk, and yielding means for impelling the levers toward each other to force the disk against its seat.

6. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, said disk having a beveled edge, a pair of levers having short arms engaging said beveled edge, and yielding means for impelling the levers toward each other to force the disk against its seat.

7. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, a pair of levers engaging said disk, yielding means for impelling the levers toward each other to force the disk against its seat, and a wedge for spreading the levers to release them from the disk.

8. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, and means for moving the disk longitudinally of its axis to engage said friction seat; the teeth of the wheels being inclined so as to wedge into tight mesh when the disk engages its seat.

9. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, means for moving the disk longitudinally of its axis to engage said friction seat; the teeth of the wheels being inclined so as to wedge into tight mesh when the disk engages its seat, a casing connected to the gear wheel, and an abutment on the carrier engaging the casing.

10. The combination with a platen axle and a ratchet wheel loose thereon, of a gear connected to the ratchet wheel, a carrier connected to the axle, a planet wheel rotatably mounted on said carrier and engaging said gear, a friction disk rotatable with said planet wheel, a friction seat for said disk, means for moving the disk longitudinally of its axis to engage the friction seat, and means for disengaging the disk from its seat.

11. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, means for moving the disk longitudinally of its axis to engage the friction seat, a block pivoted in said carrier and projecting through a slot in the carrier to engage the friction face of the disk, and means for actuating the block.

12. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, a lever for moving the disk in the direction of its axis to engage the friction seat, a wedge engaging the lever, and means for disengaging the disk from its seat.

13. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, a lever for moving the disk in the direction of its axis to engage the friction seat, a movable member carrying a wedge for actuating the lever to release the disk, said movable member having an inclined surface, and means to coöperate with said inclined surface to disengage the disk from its seat.

14. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, a pair of levers for moving the disk longitudinally to engage the friction seat, a movable member carrying a wedge for spreading the levers to release the disk, said movable member having an inclined surface, and means to coöperate with said inclined surface to disengage the disk from its seat.

15. The combination with a platen axle and a ratchet wheel loose thereon, of a bevel gear connected to the ratchet wheel, a carrier connected to the axle, a planet wheel rotatably mounted on said carrier and engaging the bevel gear, a friction disk rotatable with said planet wheel, a friction seat for said disk, a pair of levers for moving the disk longitudinally to engage the friction seat, a movable member carrying a wedge for spreading the levers to release the disk, and a block pivoted to said carrier and engaging the disk adjacent to its center, said movable member having an inclined surface for engaging said block to positively release the disk from its seat.

16. The combination with a platen axle and a ratchet wheel loose thereon, of a bevel gear connected to the ratchet wheel, a carrier connected to the axle, a planet wheel rotatably mounted on said carrier and engaging the bevel gear, a friction member rigidly connected to said planet wheel, a friction seat for said member, and means for moving said member longitudinally to engage said friction seat.

17. The combination of a platen axle, a line-space wheel loose thereon, a bevel gear wheel connected to the line-space wheel, a planetary pinion in mesh with said bevel gear wheel, a friction disk carried with said pinion, a coöperating friction surface, and means to move said pinion and friction disk radially inwardly toward the platen axle and thereby bring the friction surfaces together and cause the bevel pinion to wedge into tight mesh with the bevel gear.

18. The combination of a platen axle and a line-space wheel, a bevel gear and pinion connected respectively to said wheel and axle, a friction member carried by the pinion, a coöperating friction member on the platen axle, and means to bring the friction surfaces of said members together and simultaneously wedge the pinion into tight mesh with the gear.

19. The combination with a platen axle and a ratchet wheel loose thereon, of a gear connected to the ratchet wheel, a carrier connected to the axle, a planet wheel in mesh with the bevel gear and rotatably mounted on said carrier, a friction member connected to rotate with the platen wheel, a friction seat for said member, and means to move said friction member into and out of frictional contact with said seat.

20. The combination of a platen axle, a line-space wheel loose thereon, a gear carried by said wheel, a pinion in mesh with said gear, a shaft for said pinion extending in a direction radial to the platen axle, a support on the platen axle in which said shaft is mounted, a friction disk connected to said shaft and adapted to seat on a friction surface of said support, means to move said friction disk onto said surface and apply pressure thereto, a manual device for removing said pressure to disengage the disk, and means operated by said manual device to positively lift the disk.

21. The combination with a platen axle and a line-space wheel loose thereon, of a releasable connection therebetween comprising a gear wheel concentric with the platen axle, a planetary pinion in mesh with said wheel, a carrier for said pinion, and clutch members having coöperating friction surfaces rotating respectively with the said pinion and said carrier.

22. The combination with a platen axle and a line-space wheel loose thereon, of means for releasably connecting said wheel to the platen axle, comprising a gear wheel concentric with the platen axle, a pinion in mesh therewith rotatable about an axis radial to the platen axle, a friction member connected to rotate with said pinion, a coöperating friction member, and means to move said members into and out of frictional engagement.

23. The combination with a platen axle and a line-space wheel loose thereon, of an annular gear carried by said wheel, a support connected to the platen axle, a shaft radial to the platen axle mounted in said support, a pinion on said shaft in mesh with the annular gear, a friction disk carried by said shaft and projecting through the plane of the annular gear, and means to move said disk into and out of frictional holding engagement with said support.

24. The combination with a platen axle and a line-space wheel loose thereon, of an annular gear connected to the line-space wheel, a support fixed to the platen axle, a shaft journaled in said support and extending radially from the platen axle, a pinion fixed to said shaft and in mesh with the annular gear, a friction disk fixed to said shaft, means for moving said shaft radially inwardly and bringing the friction disk into holding engagement with said support, and a manual releasing device to move said shaft outwardly and thereby disconnect the line-space wheel from the platen axle.

25. The combination with a platen and a line-space wheel, of a connection therebetween comprising friction members movable into and out of engagement, a device for automatically moving and holding said friction members in engagement, a manual releasing element, means operated thereby to release said holding device, and additional means operated thereby to separate said frictional elements.

26. The combination with a platen and a line-space wheel, of a connection therebetween comprising friction members movable into and out of frictional engagement, a spring-actuated device for applying pressure to said members to hold them in frictional contact, a manual releasing device comprising a cam to withdraw said holding device and thereby remove the frictional pressure, and a second cam on said releasing device operable to separate the friction members.

ALFRED G. F. KUROWSKI.

Witnesses:
F. E. ALEXANDER,
JULIUS DUCKSTINE.

---

Copies of this patent may be obtained for five cents each, by addressing the "Commissioner of Patents, Washington, D. C."